United States Patent
Parkvall et al.

(10) Patent No.: US 7,685,492 B2
(45) Date of Patent: Mar. 23, 2010

(54) METHOD, ARRANGEMENT, NODE AND MOBILE UNIT FOR IMPROVED TRANSMISSION BETWEEN TWO UNITS OF A TELECOMMUNICATION SYSTEM

(75) Inventors: Stefan Parkvall, Stockholm (SE); Johan Torsner, Masaby (FI)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 652 days.

(21) Appl. No.: 10/556,213

(22) PCT Filed: May 11, 2004

(86) PCT No.: PCT/SE2004/000724

§ 371 (c)(1),
(2), (4) Date: Apr. 9, 2007

(87) PCT Pub. No.: WO2004/102864

PCT Pub. Date: Nov. 25, 2004

(65) Prior Publication Data

US 2008/0028270 A1    Jan. 31, 2008

(30) Foreign Application Priority Data

May 14, 2003   (SE) .................................. 0301447

(51) Int. Cl.
*H04L 1/18* (2006.01)
*G08C 25/02* (2006.01)
(52) U.S. Cl. ...................................................... 714/748
(58) Field of Classification Search .......... 714/748–751
See application file for complete search history.

(56) References Cited

U.S. PATENT DOCUMENTS

2002/0071407 A1   6/2002   Koo et al.
2004/0082356 A1*  4/2004   Walton et al. ................ 455/522

FOREIGN PATENT DOCUMENTS

WO   WO 02096006 A2   11/2002

OTHER PUBLICATIONS

Swedish Patent Office, International Search Report for PCT/SE2004/000724, dated Aug. 23, 2004.

* cited by examiner

*Primary Examiner*—Guy J Lamarre
(74) *Attorney, Agent, or Firm*—Roger S. Burleigh

(57) ABSTRACT

A mechanism for improved data transmission between units in a telecommunication network, where at least one of the units utilizes multiple transport channels for transmitting data. An acknowledgeable data transmission is started over a first transport channel if no other on-going acknowledgeable data transmission on a second transport channel starts or ends within a pre-defined or assigned transmission period for the first channel. Thereby, unique identification of acknowledgements messages is enabled.

20 Claims, 6 Drawing Sheets

METHOD, ARRANGEMENT, NODE AND MOBILE UNIT FOR IMPROVED TRANSMISSION BETWEEN TWO UNITS OF A TELECOMMUNICATION SYSTEM

FIELD OF THE INVENTION

The present invention relates to a method for improved transmission of multiple acknowledgeable messages in a system using an uplink or downlink hybrid ARQ-scheme.

BACKGROUND OF THE INVENTION

With regard to uplink enhancements for dedicated transport channels several techniques are currently being discussed for standardization in 3GPP, among them several retransmission functionalities, including so called Node B controlled Hybrid Automatic Repeat reQuest (HARQ). In such a scheme, a mobile unit or user equipment (UE) transmits data units (DU) in the uplink and the Node B or base station tries to decode each of them and requests retransmissions of erroneously received data units. In addition, the Node B may optionally combine received soft information from multiple transmission attempts to further increase the performance.

Wideband Code Division Multiple Access (WCDMA) systems use a concept of transport channels, where the attributes of each transport channel determine the manner and characteristics for transmitting data over the air interface. One important characteristic of a transport channel is the transmission period or Transmission Time Interval (TTI), which denotes the period of time over which coding and interleaving is performed. Currently, TTI:s of 10, 20, 40, and 80 ms are supported in the uplink, although additional values may be introduced in the future. On each transport channel, data arrives in form of one or several transport blocks per TTI. Typically, multiple transport channels are configured in a user equipment, by the radio network controller (RNC), in order to support a mix of different services; however, multiple transport channels may notwithstanding also be configured for a single service. The transport channels are coded and multiplexed into a single Coded Composite Transport CHannel (CCTrCH), which is subsequently transmitted over the air interface from the UE to the Node B. Rate matching is used to balance the quality requirements between different transport channels. The multiplexing of multiple transport channels is schematically illustrated in FIG. 3.

Retransmission functionalities, such as for example so called Hybrid ARQ, if introduced, cannot operate on the CCTrCH since not all services, e.g. voice, allow for retransmissions. Hence, the hybrid ARQ mechanism is preferably defined per transport channel. Furthermore, if so-called soft combining is supported, the corresponding ARQ mechanism has to be located between the coding and transport channel blocks. In FIG. 3, the hybrid ARQ mechanism precedes the rate matching (RM) block. However, it is equally possible for the RM block to precede the ARQ mechanism, or be merged together to constitute one single block Hybrid ARQ is currently not used for the uplink of a WCDMA-based communication system. For the HS-DSCH downlink in WCDMA, where hybrid ARQ is used, only a single transport channel with a fixed 2 ms TTI is used.

SUMMARY OF THE INVENTION

A general object of the present invention is to provide an improved transmission scheme.

A further object is to provide a method and an arrangement for enabling transmission and identification of multiple acknowledgement messages in a system using an uplink or downlink hybrid ARQ-scheme.

It is also an object of the present invention to achieve an uplink channel structure and a method for data transmission on such uplink channels that increases the data throughput on the uplink transport channels.

A further object is to support transmission on several transport channels sharing a common ACK/NACK signal.

This object and other objects are achieved by the present invention, which permits a more efficient use of the capacity of the uplink transport channels by means of a simultaneous data transmission on the multiple uplink transport channels, except for those TTI:s of an uplink transport channel where the transmission of a data block on one, of the uplink transport channels starts or ends. The invention is based on the understanding that there is one specific ACK/NACK-message applied for each (set of) data block(s) that is transmitted on one of the transport channels within a given TTI and that it is well-known within which time interval after that the transmission of said data block is finished this ACK/NACK-message must have been received.

The present invention provides a mechanism for improved data transmission between units in a telecommunication system, wherein data is transmitted over multiple transport channels, and transmission of acknowledgeable data is started on a first channel if no other transmission of acknowledgeable data starts or ends on a second channel within an assigned transmission period of the first channel. Thereby, uniquely identifiable acknowledgement messages are enabled.

An advantage of the present invention is to achieve an uplink transport channel structure having an increased throughput due to a more efficient use of the already available transport channels. The described method supports transmission on several transport channels sharing a common ACK/NACK signal and optionally a common New Data Indicator (NDI). This results in a solution with low complexity while maintaining a high user throughput. The described invention could be adopted in the work on an enhanced WCDMA uplink currently under discussion in 3GPP.

Advantages of the present invention include:
Improved transmission scheme,
Enabled transmission and identification of multiple acknowledgement messages,
Increased throughput on uplink transport channels,

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described with reference to the above drawings.

According to a general embodiment, the present invention provides a mechanism for improved data transmission between units in a telecommunication network, where at least one of the units utilizes multiple transport channels for transmitting data. An acknowledgeable data transmission is started over a first transport channel if no other on-going acknowledgeable data transmission on a second transport channel starts or ends within a pre-defined or assigned transmission period for the first channel. Thereby, unique identification of acknowledgements messages is enabled. In other words, it is possible to identify an acknowledgement message and relate the message to a certain transport channel.

Figure 1:
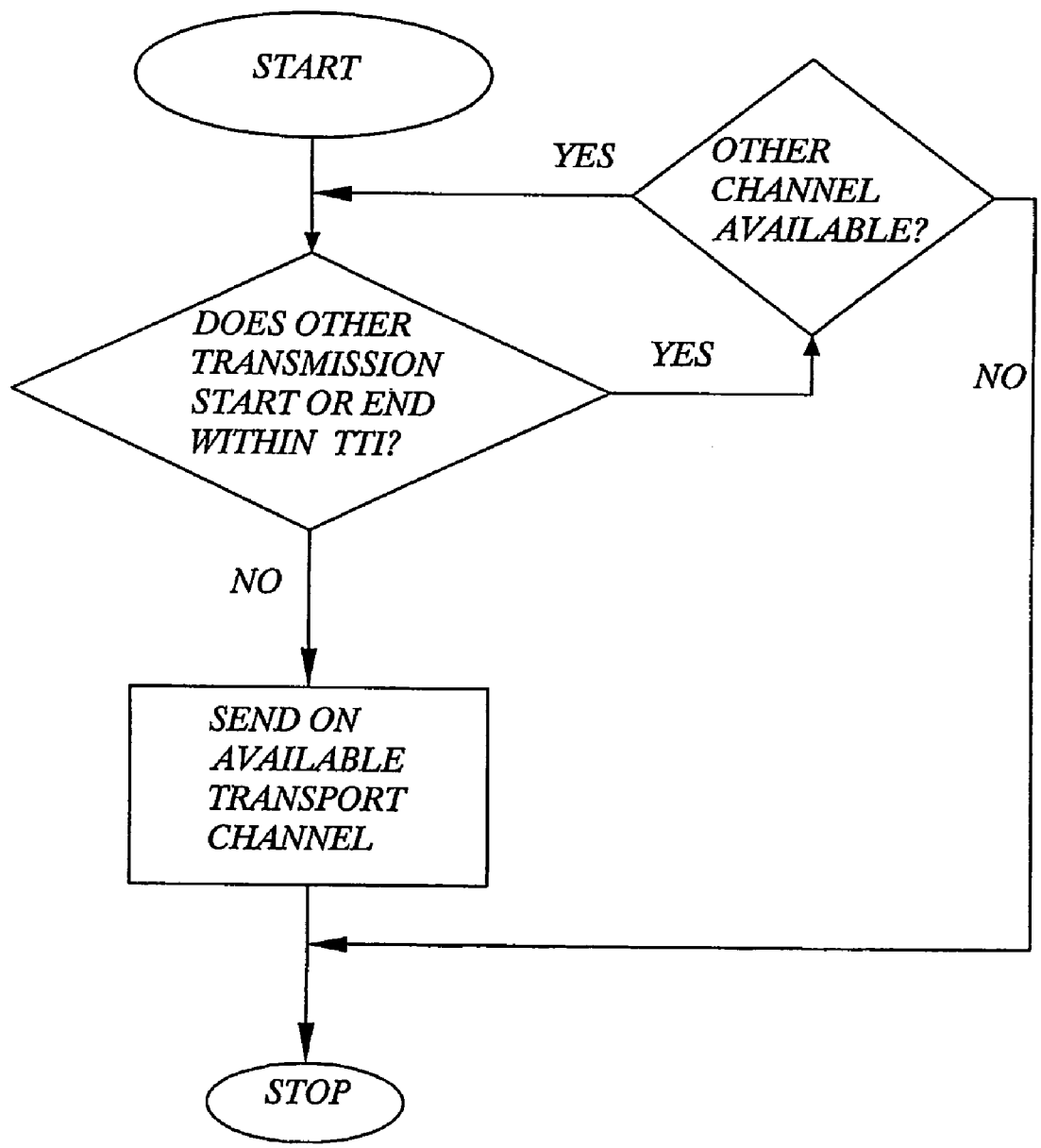
FIG. 1 shows a schematic flow diagram of an embodiment of a method according to the invention.

The general embodiment is illustrated in FIG. 1. Initially, on-going transmission of acknowledgeable data i.e. data which enables retransmissions, on other transport channels are checked. If no such transmission starts or ends within an assigned transmission period, or Transmission Time Interval for an available transport channel, then transmission of acknowledgeable data is started on the available channel. It is understood that even if the transmission on all TTI:s in WCDMA start at the same time the logic of the invention is applied sequentially on all transport channels such that the result is that data is transmitted on (not more than) one transport channel.

Although the invention and embodiments thereof in the following mainly are described in the context of a WCDMA network with Node B and mobile units, and utilizes hybrid ARQ, its is implied that the invention is not limited to those. Instead, the invention is applicable to other retransmission functionalities, both known and future.

Figure 2:
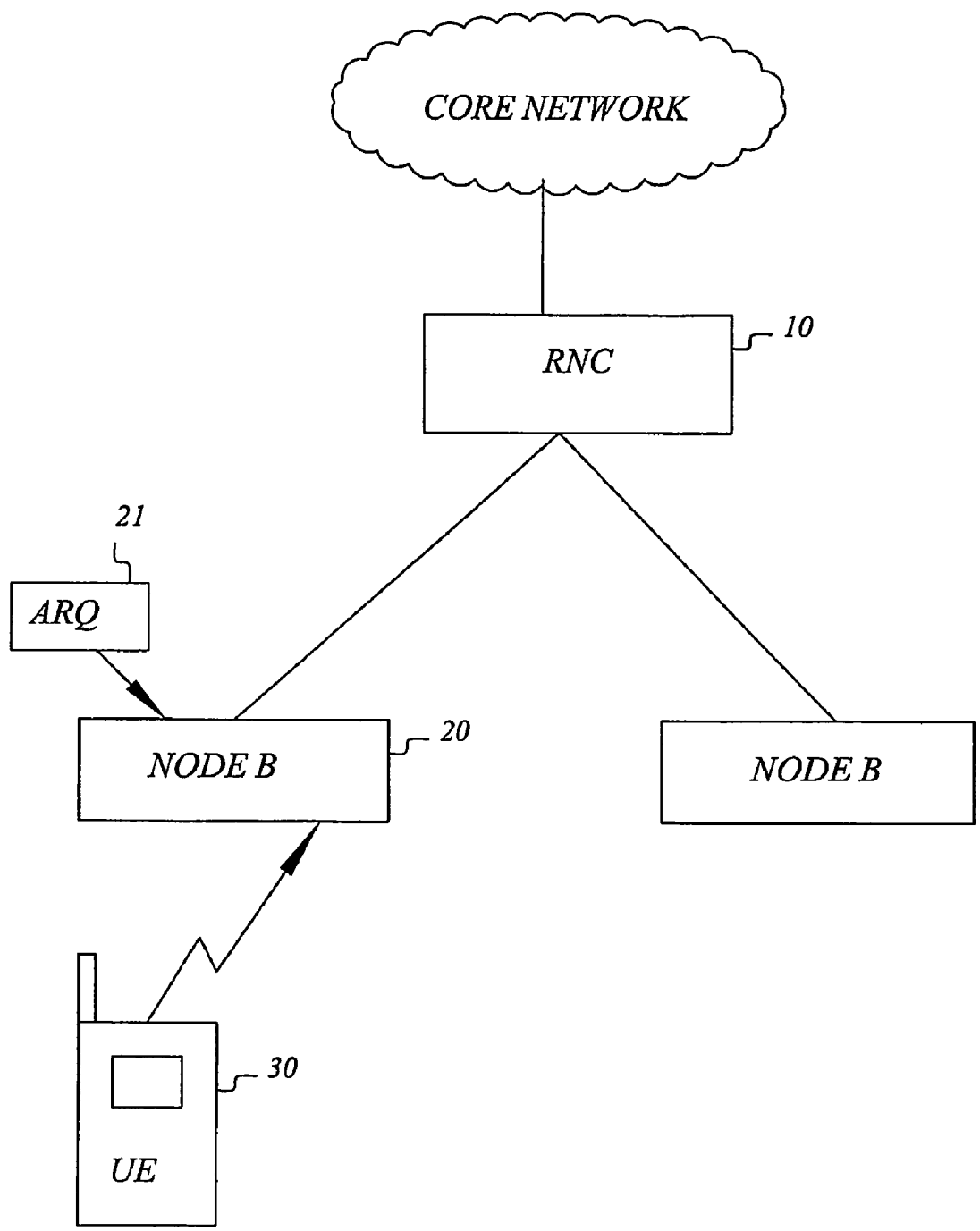
FIG. 2 illustrates a general telecommunications system in which the present invention can be implemented.

FIG. 2 illustrates a general telecommunication system, comprising a core network, at least one radio network controller RNC, at least two nodes Node B 20 and a mobile unit or user equipment UE 30. According to the invention, a retransmission functional entity ARQ 21 is implemented in one Node B 20.

One of the major arguments behind so called Node B terminated hybrid ARQ protocols is the possibility for rapid retransmissions, which is advantageous from a performance perspective. In the transport channel structure described in FIG. 3, the shortest delay can be achieved if a hybrid ARQ status report is transmitted once per TTI for each transport channel using hybrid ARQ. At the same time, it is important to keep the size, denoted in terms of bits and power, for each status report as small as possible in order to not consume excessive resources on the downlink. Hence, a single bit indicating ACK, i.e. a successful decoding, or NACK, i.e. a retransmission request, is preferable. Typically, a well-defined time is agreed upon from the reception of the data until the transmission of the ACK/NACK indicator. By using a well-defined agreed processing time, it is possible to relate the ACK/NACK to a given transmission in the uplink.

If soft combining is to be supported, a so called New Data Indicator (NDI) is required in the uplink. For each TTI, the NDI indicates whether a so called soft buffer should be cleared or soft combining should be performed prior to decoding. Similarly to the downlink, it is desirable not to transmit excessive information in the uplink direction and the number of bits for the NDI should be kept as small as possible. Preferably, one or two bits are used for the NDI.

Figure 3:
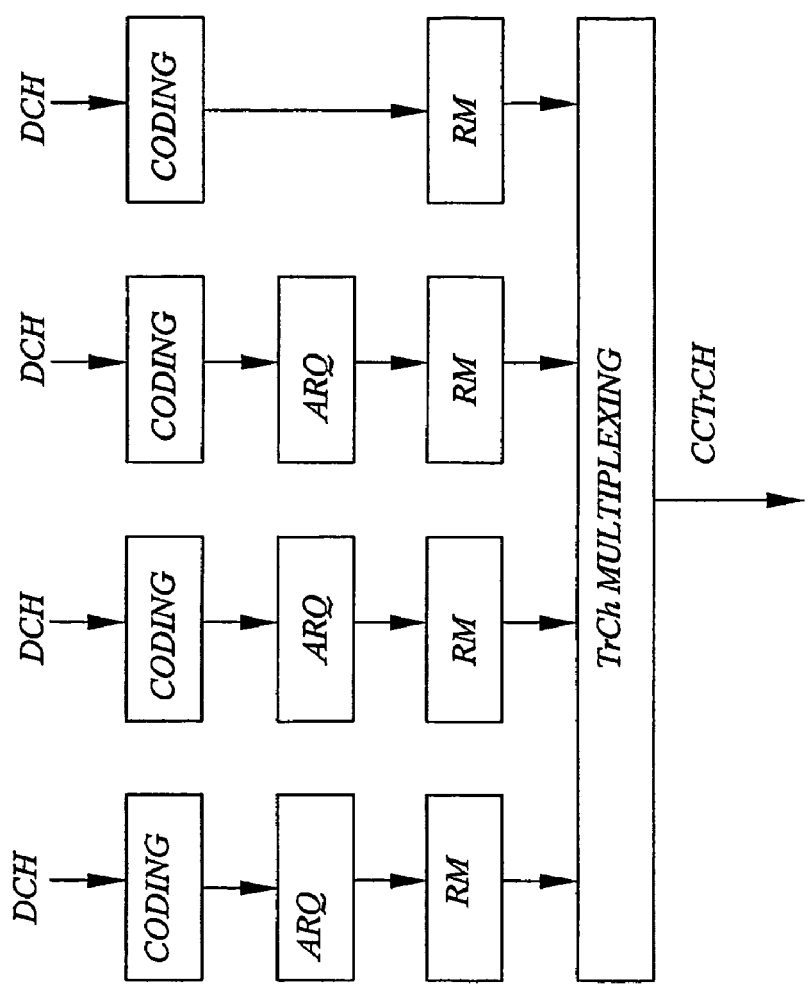
FIG. 3 shows the principle of uplink transport channel multiplexing.

When applying multiple transport channels, as indicated in FIG. 3, it has been observed to be a problem that it is only possible to transmit acknowledgeable data on one uplink transport channel at a time. When assuming that only a single ACKnowledgement/Negative ACKnowledgement (ACK/NACK) is possible to transmit per TTI and a predefined or fixed time relation is used, it is not possible to distinguish to which of the multiple uplink transport channels a certain acknowledgement message ACK/NACK, which has been received on the downlink channel, belongs. This implies a problem especially for transport channels for which a large value for the TTI has been configured, e.g. 80 ms, since no data can be transported simultaneously on the other transport channels using ARQ during an ongoing transmission of a data block on said transport channel having the large TTI-value.

Basically, according to the present invention, at the beginning of a TTI, only one of a plurality of transport channels with implemented retransmission functionality, preferably HARQ, is allowed to transmit messages requiring an acknowledgement. In the following such transmissions are referred to as acknowledgeable data transmissions, or transmission of acknowledgeable data. This removes the ambiguity regarding which transport channel the NDI and ACK/NACK relates to, thereby enabling unique identification of which transport channel/transmitted data the ACK/NACK refers to.

Figure 4:
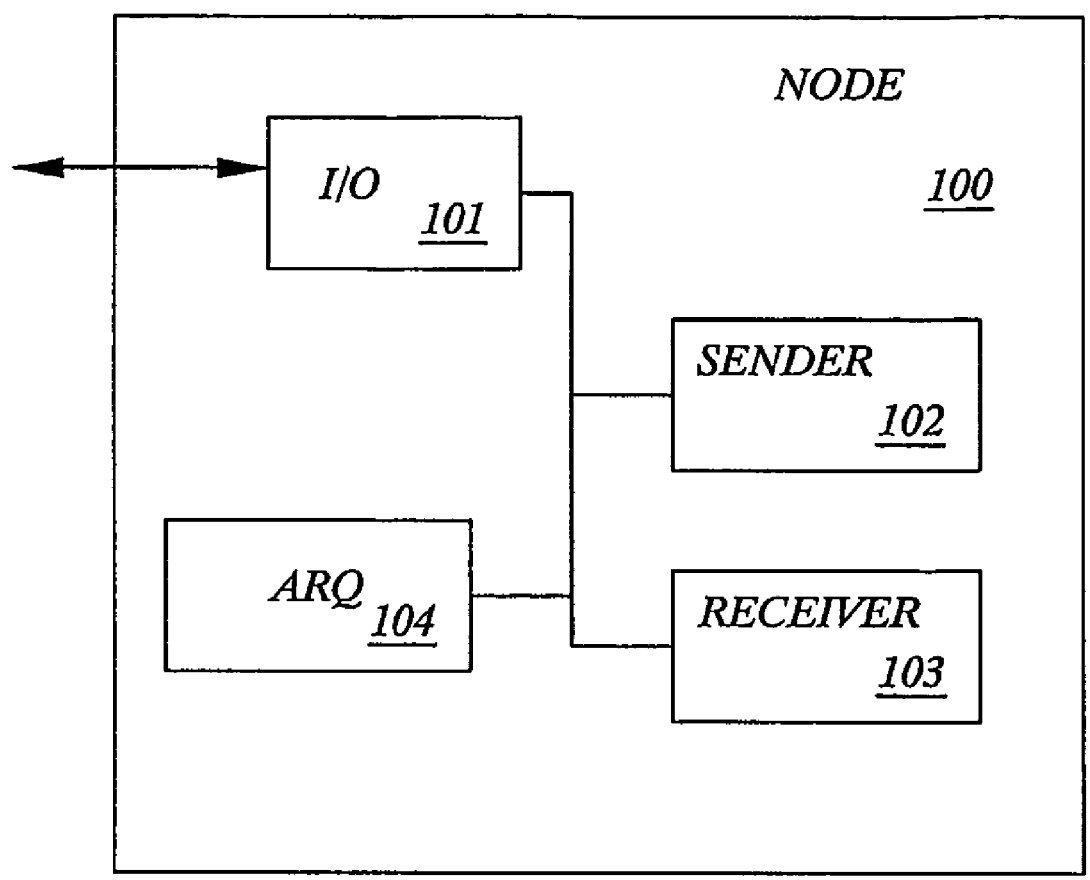
FIG. 4 illustrates an embodiment of the present invention.

In FIG. 4, a general embodiment of an arrangement 100 according to the invention is illustrated. It comprises an I/O unit 101, a sender 102, a receiver 103 and a retransmission functional entity 104. It is understood that the different parts can be implemented as parts of the I/O unit. The sender 102 is adapted to start acknowledgeable data transmissions on a first transport channel if no on-going acknowledgeable data transmission on a second transport channel starts or ends within an assigned or given transmission period for the first channel. The retransmission entity 104 is adapted to provide retransmission functionality to at least two of a plurality of transport channels from the arrangement 100. Correspondingly, the receiver 103 is adapted to receive uniquely identifiable acknowledgement messages, positive or negative, in response to the acknowledgeable data transmissions on the at least first and second transport channels.

Figure 5:
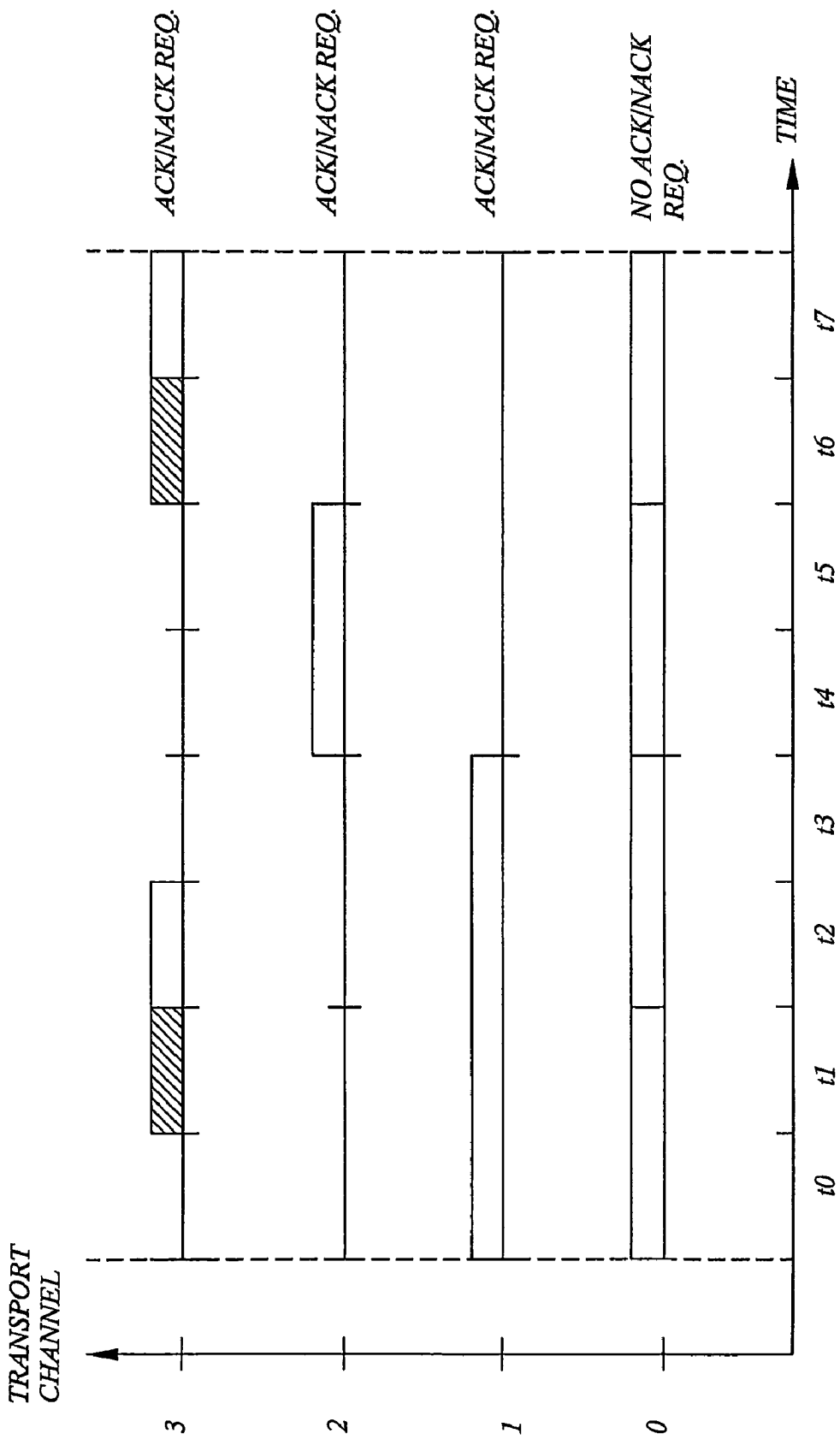
FIG. 5 is a schematic illustration of acknowledgeable data transmissions on multiple transport channels according to an embodiment of the present invention.

An embodiment of the present invention will now be described with reference to FIG. 5. FIG. 5 illustrates schematically transmission of data on four transport channels 0, 1, 2, 3 during a plurality of time periods t0-t7. Each transport channel 0, 1, 2, 3 has an assigned TTI, where channel 3 has the shortest TTI and channel 1 has the longest TTI. The length of each time period typically corresponds to the shortest TTI. Transport channels 1, 2, 3 are configured for acknowledgeable data transmissions, whereas channel 0 is not. As stated earlier, at the beginning of a TTI, only one of the transport channels with retransmission functionalities such as HARQ is allowed to start transmitting data.

In this exemplary embodiment, transport channel 1 transmits acknowledgeable data in time interval $t_{0-3}$. Thus, the transport channel 3 can potentially start transmitting acknowledgeable data within time intervals $t_1$ or $t_2$, whereas channel 2 can only potentially start transmitting acknowledgeable data within time interval $t_4$ as the NDI (optionally), is used by transport channel 1 during time intervals $t_0$ and $t_3$. In this embodiment, acknowledgeable data is transmitted over channel 3 during time intervals $t_1$ and $t_2$.

At the start of time interval $t_4$, transmission of acknowledgeable data is started over channel 2, whereby, transport channel 1 cannot start transmitting data in time interval $t_4$ as this time interval is used for transmission on transport channel 2 for the NDI and ACK/NACK respectively. Similarly, channel 3 cannot transmit during time intervals $t_{4-5}$. This is shown more explicitly in the embodiment of FIG. 6.

Also, according to another embodiment, channel 0 is a transport channel without implemented HARQ. Thereby, the above mentioned limitations are not applicable, and transmissions can be performed regardless of how and when transmissions start or end on the other transport channels 1, 2, 3.

In the above example, it is assumed for illustrative purposes that the ACK/NACK is transmitted in the same TTI as a received transmission is ended. In reality, the ACK/NACK will be transmitted some time after the data has been received.

The result of this embodiment is that data transmission over a transport channel using a long TTI only blocks transmission on other transport channels during a fraction of the time. For example, when configuring a first uplink transport channel with $TTI_1=2$ ms and configuring a second uplink transport channel with $TTI_2=80$ ms, data on the first uplink transport channel can be transmitted in 38 out of 40 intervals having $TTI_1=2$ ms even if the second uplink transport channel having $TTI_2=80$ ms has a higher priority. The selection of the transport channel that will be used when data is available on more than one transport channel is done based on priorities of the logical channels and/or transport channels in combination with the above rules.

Figure 6:
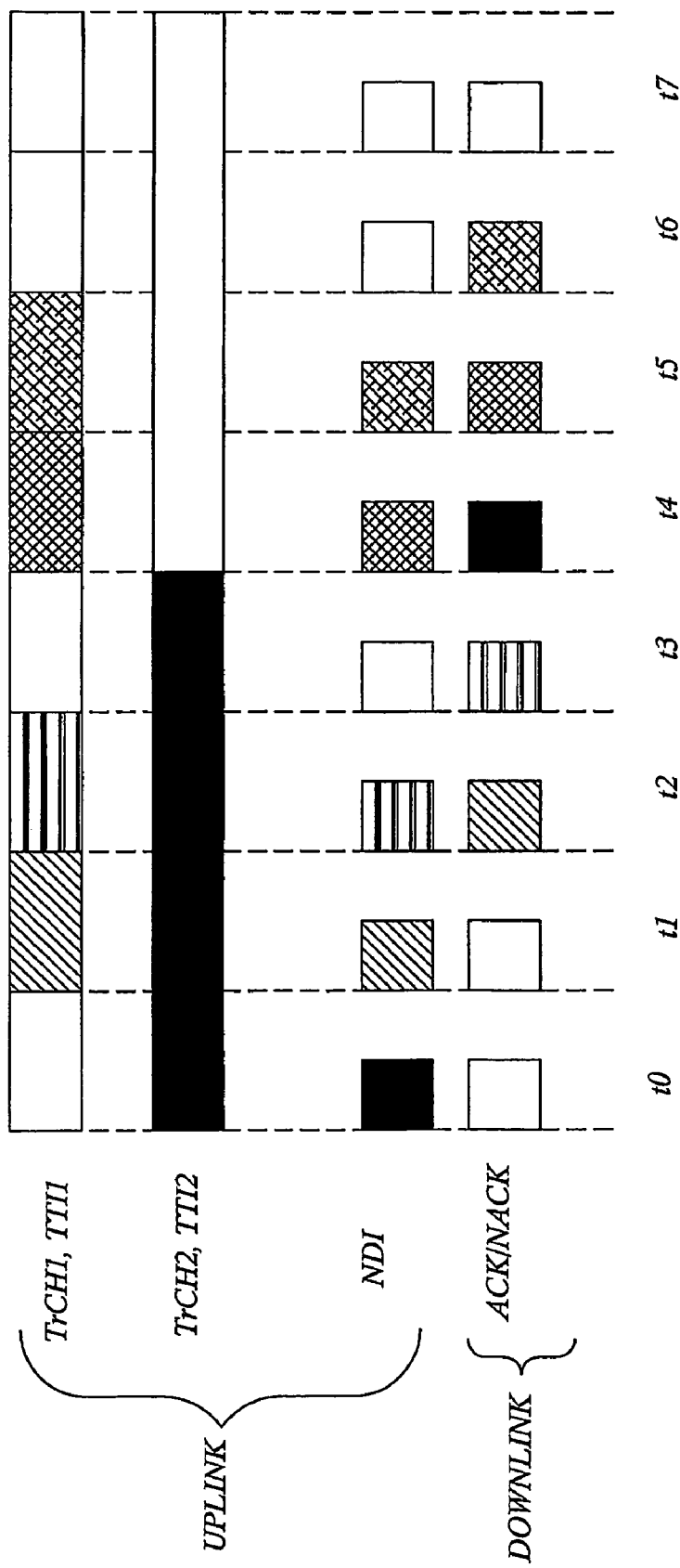
FIG. 6 illustrates another embodiment according to the invention of transmissions on multiple transport channels sharing a New Data Indicator (NDI) and ACK/NACK-messages

FIG. 6 illustrates a further embodiment according to the invention, wherein the invention is implemented for uplink transmission of acknowledgeable data on two transport channels TrCH1, TrCH2 and a new data indicator NDI, and downlink transmission of ACK/NACK. The two transport channels each has an assigned TTI TTI1, TTI2, at the beginning of which transmission can potentially start. Data is transmitted over one channel TrCH2 during time intervals t0-t3, whereby transmission over the other channel TrCH1 only is possible within time intervals t1-t2, or t4-t7. The above discussion with reference to FIG. 5 is applicable also for this specific example.

According to another embodiment of the invention, simultaneous data transmission on multiple transport channels with identical TTI:s are possible, although the ACK/NACK and NDI in this case is valid for all the transport channels under consideration, i.e., either all the transport channels have to be retransmitted or considered to be successfully decoded.

According to a further embodiment of the present invention, if several transport channels are available for transmission, some selection criterion is needed. One such criterion could be a priority value for each channel. Consequently, such a priority value is assigned to each or some of the channels, and the subsequent selection of a channel is based on that priority value.

In addition, some information is typically needed to indicate which transport channel that carries data in a particular TTI. There are several possibilities. Outband signaling (TFCI signaling) indicating the transport channel identity is one possibility. Alternatively inband signaling, e.g., in the MAC header, can be used.

In general, the retransmission functionality may be implemented as hardware, software, firmware or any suitable combination thereof, using for example microprocessor technology, digital signal processing or ASIC (Application Specific Integrated Circuit or other sub-micron technology. For example, the retransmission functionality may be implemented as software for execution by a computer system. The software may be written in almost any type of computer language, such as C, C++, Java or even specialized proprietary languages.

The present invention has been described by using the uplink transport channel of a WCDMA-based communication system as an example. It is however possible to apply the invention also for other types of channels. Likewise it is possible to implement the method and arrangement according to the invention in either at least one of a Node B, a base station, a mobile unit or some other node or part of a telecommunication system.

It will be understood by those skilled in the art that various modifications and changes may be made to the present invention without departure from the scope thereof, which is defined by the appended claims.

The invention claimed is:

1. A method for improved data transmission between a first and a second unit of a telecommunication system, utilizing at least two transport channels between said units, comprising the step of:
   determining the status of acknowledgeable data transmissions on a first transport channel; and,
   starting an acknowledgeable data transmission over a second transport channel if no other on-going acknowledgeable data transmission on said first transport channel starts or ends within an assigned transmission period for said second transport channel.

2. The method according to claim 1, wherein said method enables uniquely identifiable acknowledgement messages.

3. The method according to claim 1, wherein said first transport channel and said second transport channel are configured for enabling retransmissions.

4. The method according to claim 1, further comprising the steps of:
   receiving the data transmission at the second unit; and,
   in response to said data transmission on the second transport channel, sending an acknowledgement message from the second unit to the first unit.

5. The method according to claim 4, wherein said acknowledgement message comprises a positive or a negative acknowledgement.

6. The method according to claim 1, further comprising the steps of
   assigning a priority value to each of the transport channels; and,
   identifying an available transport channel based on said assigned priority value.

7. The method according to claim 1, wherein said transmission period is defined by a dedicated Transmission Time Interval for the transport channel, with respect to a given time frame, at the beginning of which interval transmission can start.

8. The method according to claim 1, wherein said first unit is a mobile unit and said second unit is a Node B and said acknowledgeable data is transmitted on an uplink.

9. A telecommunication system for data transmissions utilizing at least two transport channels, comprising:
   means for determining the status of acknowledgeable data transmissions on a first transport channel; and,
   means for starting an acknowledgeable data transmission over a second transport channel if no other on-going acknowledgeable data transmission on said first transport channel starts or ends within an assigned transmission period for said second transport channel.

10. The system according to claim 9, wherein at least said first transport channel and said second transport channel are adapted for enabling retransmissions.

11. The system according to claim 10, further comprising means for receiving an acknowledgement message in response to sending on said second transport channel.

12. A telecommunication system node adapted to utilize at least two transport channels, comprising:
   means for determining the status of acknowledgeable data transmissions on a first transport channel; and, means for starting an acknowledgeable data transmission over a second transport channel if no other on-going acknowledgeable data transmission on said first transport channel starts or ends within an assigned transmission period for said second transport channel.

13. The node according to claim 12, further comprising means for receiving an acknowledgement message in response to sending on said second transport channel.

14. The node according to claim 12, wherein said node is a base station.

15. The node according to claim 12, wherein said node is a Node B.

16. The node according to claim 12, wherein said node is a mobile unit.

17. The node according to claim 12, wherein said telecommunication system is a WCDMA-system.

18. A mobile unit adapted for operation in a telecommunication system, said mobile unit utilizing at least two transport channels for transmissions, comprising:
   means for determining the status of acknowledgeable data transmissions on a first transport channel; and,
   means for starting an acknowledgeable data transmission over a second transport channel if no other on-going acknowledgeable data transmission on said first transport channel starts or ends within an assigned transmission period for said second transport channel.

19. The mobile unit according to claim 18, wherein at least said first transport channel and said second transport channel are adapted for enabling retransmissions.

20. The mobile unit according to claim 19, further comprising means for receiving an acknowledgement message in response to sending on said second channel.

* * * * *